United States Patent
Kotecha et al.

(10) Patent No.: US 9,088,904 B2
(45) Date of Patent: Jul. 21, 2015

(54) BUNDLED CHARGING FOR OVER-THE-TOP AND HOSTED SERVICES IN IP WIRELESS NETWORKS

(71) Applicant: Verizon Patent and Licensing Inc., Basking Ridge, NJ (US)

(72) Inventors: Lalit R. Kotecha, San Ramon, CA (US); Jignesh S. Panchal, Somerset, NJ (US); Raafat Edward Kamel, Little Falls, NJ (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 13/860,172

(22) Filed: Apr. 10, 2013

(65) Prior Publication Data
US 2014/0307549 A1 Oct. 16, 2014

(51) Int. Cl.
*H04W 28/02* (2009.01)

(52) U.S. Cl.
CPC .................................. *H04W 28/0268* (2013.01)

(58) Field of Classification Search
USPC .................................. 370/259, 235, 230, 329
See application file for complete search history.

(56) References Cited

U.S. PATENT DOCUMENTS

| | | | |
|---|---|---|---|
| 2005/0055220 A1* | 3/2005 | Lee et al. | 705/1 |
| 2011/0219431 A1* | 9/2011 | Akhtar et al. | 726/4 |
| 2012/0296784 A1* | 11/2012 | Connor | 705/34 |
| 2013/0329550 A1* | 12/2013 | Kotecha et al. | 370/230 |
| 2014/0160990 A1* | 6/2014 | Sachdev et al. | 370/259 |

\* cited by examiner

*Primary Examiner* — Albert T Chou

(57) ABSTRACT

A system may receive a request to receive a particular quality of service level for traffic flow between a user device and an over-the-top application server that provides an over-the-top application service. The over-the-top application server may be outside of a service provider network. The system may determine that the user device is to receive the particular quality of service level for the over-the-top application service based on receiving the request. The system may cause the traffic flow to receive the particular quality of service level based on determining that the user device is to receive the particular quality of service level. The traffic flow may be transmitted using the service provider network. The system may determine usage information associated with the traffic flow, where the usage information identifies the user device and the particular quality of service level. The system may provide the usage information.

20 Claims, 11 Drawing Sheets

| User ID 510 | User Device ID 520 | Over-the-Top Application ID 530 | Opt-In 540 | Opt-Out 550 | Quality of Service Level 560 | Registered for Unified Billing 570 |
|---|---|---|---|---|---|---|
| jsmith | UD1 | VoiceCall | X | | QCI 1 | X |
| jsmith | UD1 | VideoTime | X | | QCI 3 | X |
| jsmith | UD1 | NetPhone | | X | | |

FIG. 5

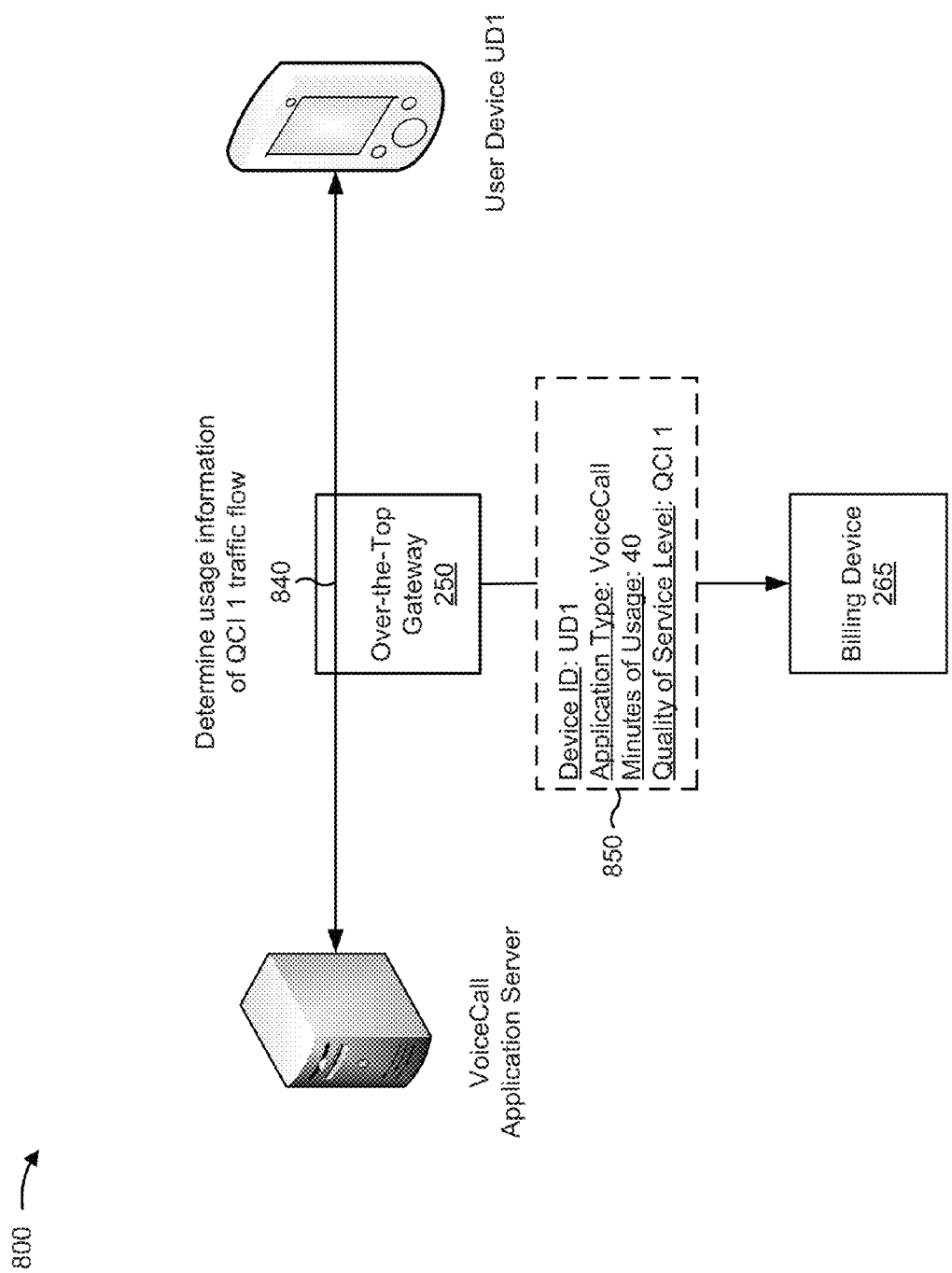

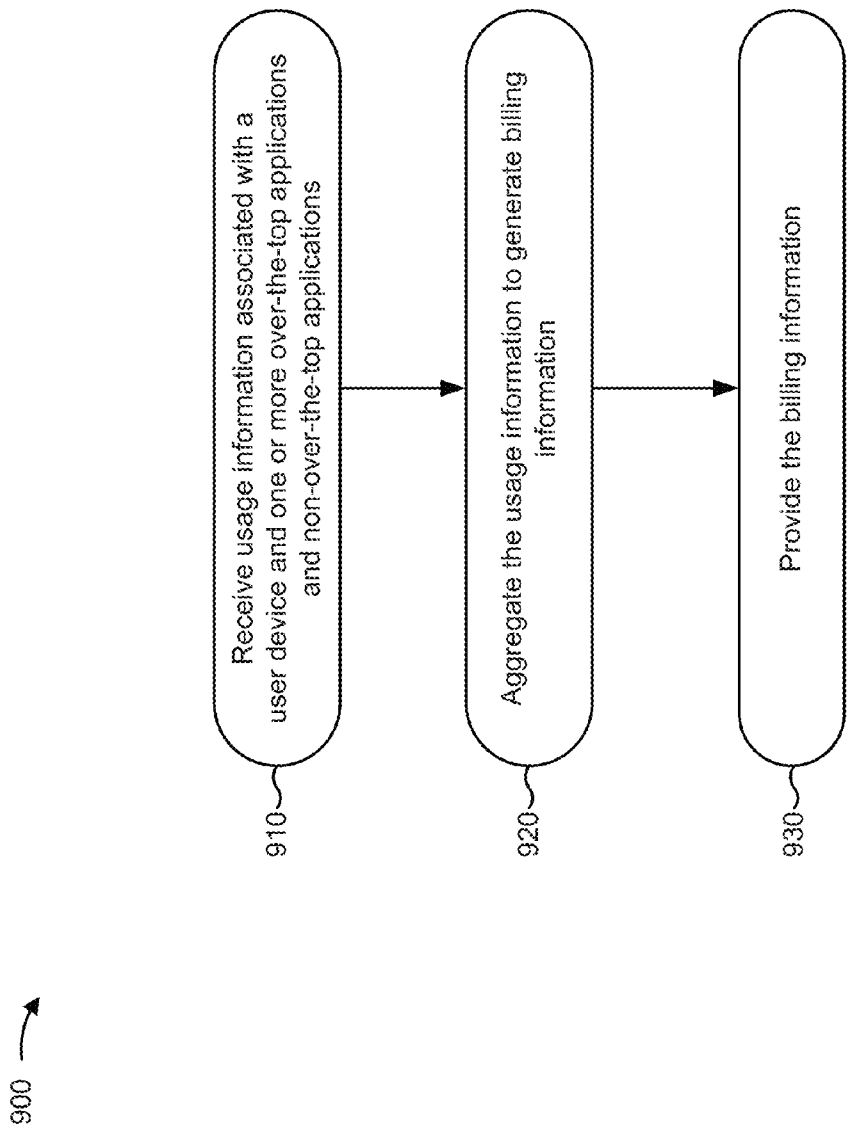

US 9,088,904 B2

BUNDLED CHARGING FOR OVER-THE-TOP AND HOSTED SERVICES IN IP WIRELESS NETWORKS

BACKGROUND

A user may use various types of different applications on a user device. One type of application that the user may use on the user device is an over-the-top ("OTT") application. An OTT application may provide an application service using an OTT application server that is outside of a service provider network. However, the OTT application server may use the service provider network to transfer traffic associated with the OTT application service. The OTT application service could be an audio, video, voice, or other type of service.

BRIEF DESCRIPTION OF DRAWINGS

FIG. 5 is a diagram of an example data structure that stores an indication that a quality of service level is to be used for providing an OTT application;

FIGS. 8A-8B are diagrams of an example implementation relating to the example process shown in FIG. 7;

FIG. 9 is a flow chart of an example process for aggregating usage information and providing billing information associated with one or more OTT applications.

DETAILED DESCRIPTION

The following detailed description of example implementations refers to the accompanying drawings. The same reference numbers in different drawings may identify the same or similar elements.

Network service providers may wish to provide over-the-top ("OTT") third party application services to subscribers, with similar quality of service treatment as non-OTT application services (e.g., service provider services, such as voice over long term evolution ("VoLTE") services, circuit switched voice services, etc.), or with a guaranteed quality of service level. For example, the network service provider may wish to guarantee a quality of service level when delivering third party voice services, video services, etc., to subscribers of the service provider. When providing such services, the network service provider may want to track subscriber usage of the OTT applications, and associated quality of service treatment, for billing purposes. Implementations described herein may assist a network service provider in tracking subscriber usage of various OTT applications quality of service treatment, and providing usage information to a service provider billing system to create a unified subscriber bill that includes billing information for OTT application services and non-OTT application services.

Figure 1:
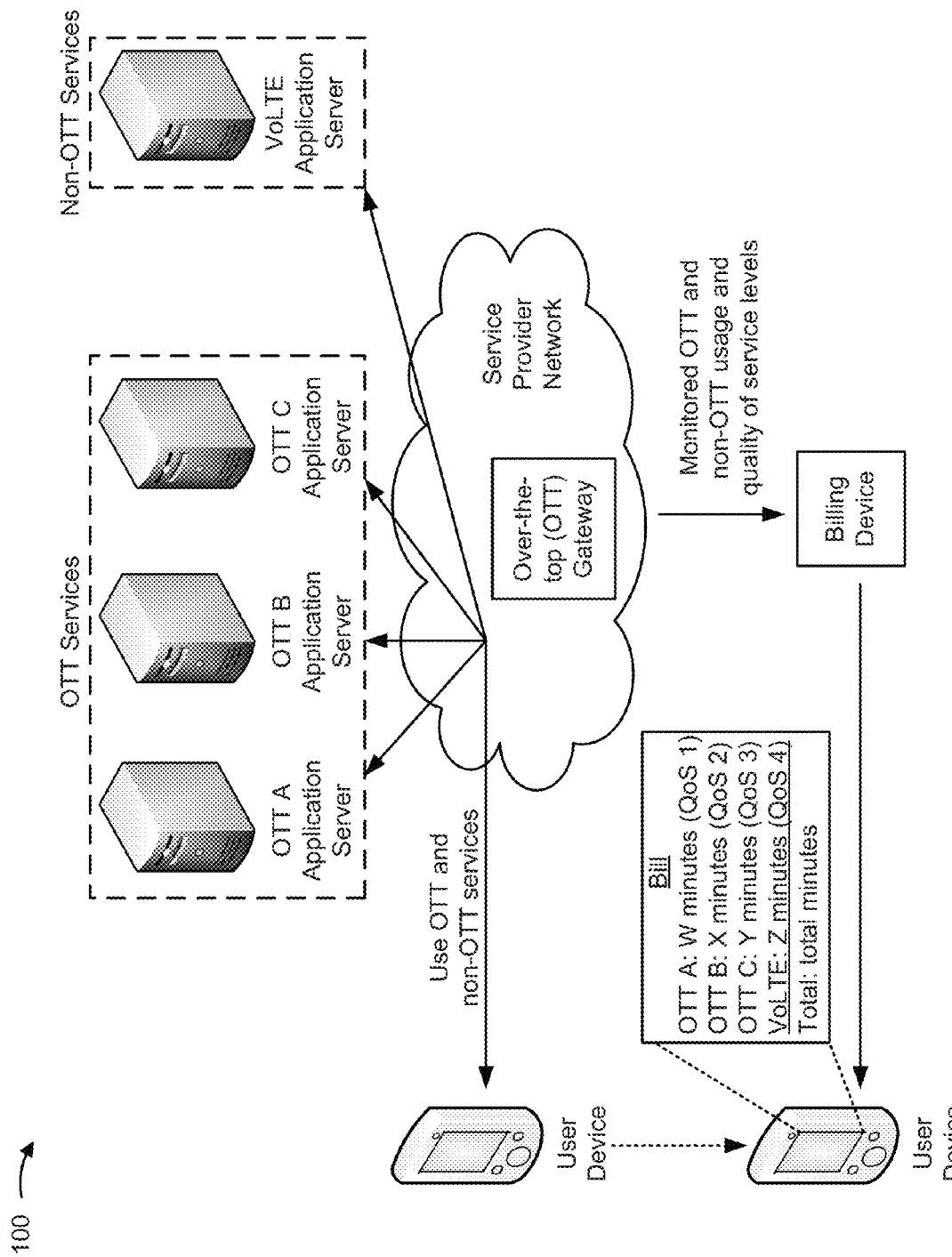
FIG. 1 is a diagram of an overview of an example implementation described herein.

FIG. 1 is a diagram of an overview of an example implementation 100 described herein. As shown in FIG. 1, assume that a user device accesses OTT services, from multiple OTT application servers, via a service provider network. Further assume that the user device accesses a non-OTT service, from a non-OTT application server, via the service provider network. An OTT gateway may monitor usage of the OTT services, by the user device, and a quality of service level provided by the service provider network when serving the OTT services to the user device. In some implementations, the OTT gateway may assist in providing the OTT services to the user device.

As further shown in FIG. 1, the OTT gateway may monitor OTT usage information, such as a quantity of time that the user device used the OTT application, a quality of service level with which the OTT application was provided to the user device, etc. The OTT gateway may transmit the OTT usage information to a billing device associated with the service provider. The billing device may also receive non-OTT usage information (e.g., from the OTT gateway and/or from another device). The billing device may provide billing information to the user device and/or to another device that permits a user to access billing information. The billing information may indicate, for example, a quantity of minutes that the user device used each OTT application and/or non-OTT application, and a quality of service level with which each OTT application and/or non-OTT application was provided to the user device. In this way, a network service provider may provide a subscriber with a bill that includes billing information for OTT application services and non-OTT application services.

Figure 2:
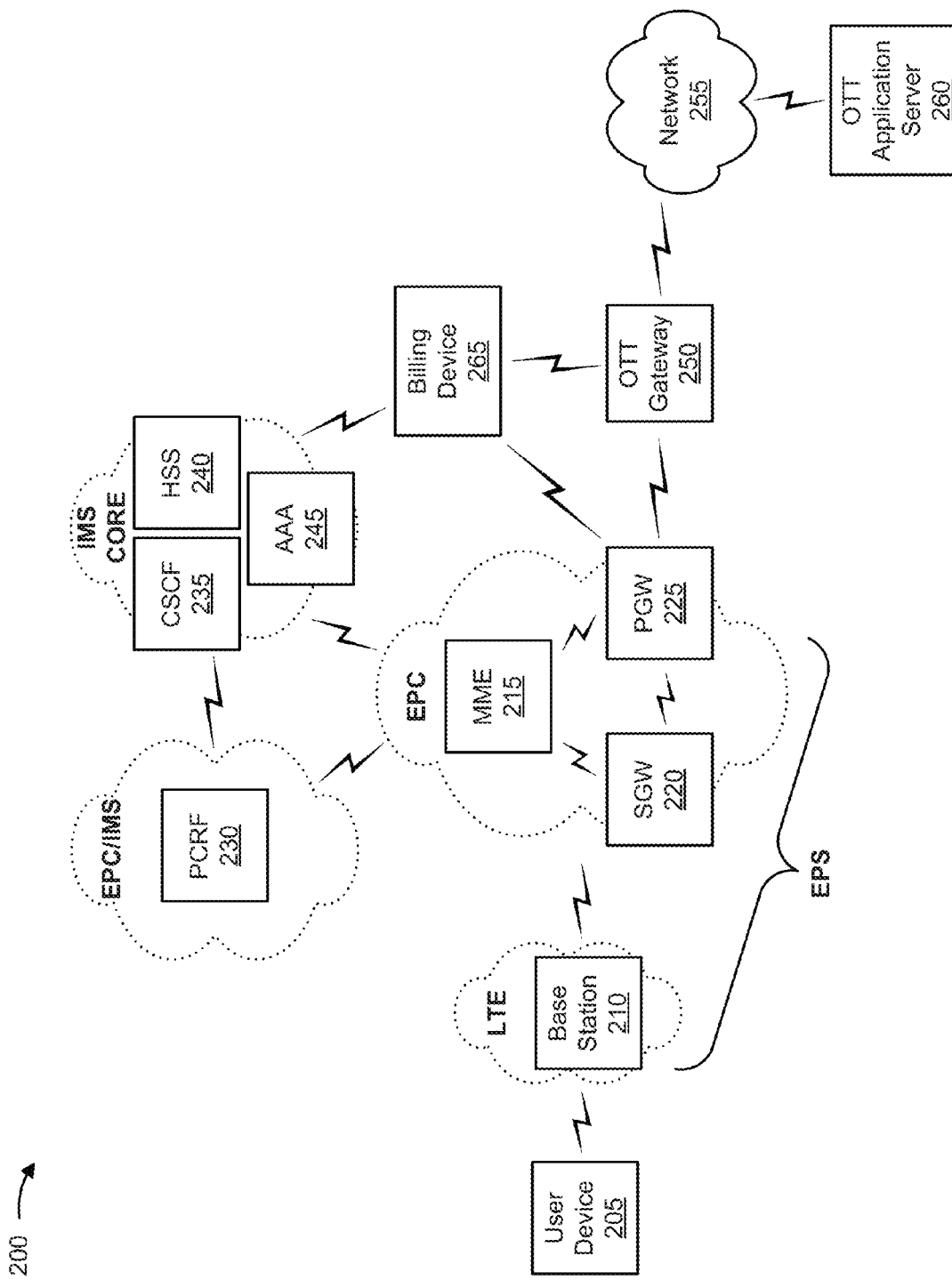
FIG. 2 is a diagram of an example environment in which systems and/or methods described herein may be implemented.

FIG. 2 is a diagram of an example environment 200 in which systems and/or methods described herein may be implemented. Environment 200 may include a user device 205, a base station 210, a mobility management entity device 215 (hereinafter referred to as "MME 215"), a serving gateway 220 (hereinafter referred to as "SGW 220"), a packet data network ("PDN") gateway 225 (hereinafter referred to as "PGW 225"), a policy and charging rules function ("PCRF") server 230, (hereinafter referred to as "PCRF server 230"), a call session control function ("CSCF") server 235 (hereinafter referred to as "CSCF server 235"), a home subscriber server ("HSS") 240 (hereinafter referred to as "HSS 240"), an authentication, authorization, and accounting ("AAA") server 245 (hereinafter referred to as "AAA server 245"), an over-the-top ("OTT") gateway 250 (hereinafter referred to as "OTT gateway 250"), a network 255, an OTT application server 260, and a billing device 265.

Some implementations are described herein as being performed within a long term evolution ("LTE") network for explanatory purposes. Some implementations may be performed within a network that is not an LTE network, such as a third generation ("3G") network.

Environment 200 may include an evolved packet system ("EPS") that includes an LTE network and/or an evolved packet core ("EPC") that operate based on a third generation partnership project ("3GPP") wireless communication standard. The LTE network may be a radio access network ("RAN") that includes one or more base stations 210 that take the form of evolved Node Bs ("eNBs") via which user device 205 communicates with the EPC. The EPC may include MME 215, SGW 220, and PGW 225 that enable user device 205 to communicate with network 255 and/or an Internet protocol ("IP") multimedia subsystem ("IMS") core. The IMS core may include CSCF server 235, HSS 240, and/or AAA server 245, and may manage authentication, session initiation, account information, profile information, etc., associated with user device 205. PCRF server 230, HSS 240, and AAA server 245 may reside in the EPC and/or the IMS core.

User device 205 may include a device that is capable of communicating with base station 210 and/or a network (e.g., network 255). For example, user device 205 may include a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or a similar device. User device 205 may send traffic to and/or receive traffic from network 255 (e.g., via base station 210, SGW 220, PGW 225, and/or OTT gateway 250).

Base station 210 may include a device capable of transferring traffic, such as audio, video, text, and/or other traffic, destined for and/or received from user device 205. In some implementations, base station 210 may be include an eNB associated with the LTE network that receives traffic from and/or sends traffic to network 255 via SGW 220, PGW 225, and/or OTT gateway 250. Additionally, or alternatively, one or more base stations 210 may be associated with a RAN that is not associated with the LTE network. Base station 210 may send traffic to and/or receive traffic from user device 205 via an air interface. In some implementations, base station 210 may be associated with a small cell, such as a microcell, a picocell, and/or a femtocell.

MME 215 may include a device capable of managing authentication, activation, deactivation, and mobility functions associated with user device 205. For example, MME 215 may include a server. In some implementations, MME 215 may perform operations relating to authentication of user device 205. Additionally, or alternatively, MME 215 may facilitate the selection of a SGW 220 and/or PGW 225 to serve traffic to and/or from user device 205. MME 215 may perform an operation associated with handing off user device 205 from a first base station 210 to a second base station 210 when user device 205 is transitioning from a cell associated with the first base station 210 to a cell associated with the second base station 210. Additionally, or alternatively, MME 215 may select another MME (not pictured), to which user device 205 should be handed off (e.g., when user device 205 moves out of range of MME 215).

SGW 220 may include a device capable of routing user data packets. For example, SGW 220 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers traffic. In some implementations, SGW 220 may aggregate traffic received from one or more base stations 210 associated with the LTE network, and may send the aggregated traffic to network 255 (e.g., via PGW 225 and/or OTT gateway 250) and/or other network devices associated with the IMS core and/or the EPC. SGW 220 may also receive traffic from network 255 and/or other network devices, and may send the received traffic to user device 205 via base station 210. Additionally, or alternatively, SGW 220 may perform operations associated with handing off user device 205 to and/or from the LTE network.

PGW 225 may include a device capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255 and may send the traffic to user device 205 via SGW 220.

PCRF server 230 may include a device, such as a server, capable of determining and/or enforcing policy rules in an EPC/IMS/LTE network. In some implementations, PCRF server 230 may establish quality of service and charging (e.g., packet accounting) rules for a communication session based on committed quality of service levels per user, per user device, per service type, per application, etc. PCRF server 230 may receive input (e.g., from the IMS core) regarding users, user devices 205, subscriptions, and/or applications. PCRF server 230 may create quality of service and charging policy rules for the session (e.g., for a user, a user device 205, an application, etc.), and may provide the policy rules to PGW 225, which may handle packets for the communication session with a particular user device 205 (e.g., running a particular application) based on the policy rules.

CSCF server 235 may include a device, such as a server, capable of managing signal and control functions in the IMS network. In some implementations, CSCF server 235 may process and/or route calls to and from user device 205 via the EPC. For example, CSCF server 235 may process calls received from network 255 that are destined for user device 205. In another example, CSCF server 235 may process calls received from user device 205 that are destined for network 255.

HSS 240 and/or AAA server 245 may include one or more devices, such as one or more server devices, capable of managing subscription and/or other information associated with user device 205. For example, HSS 240 may receive, store and/or provide profile information associated with user device 205 that identifies applications (e.g., OTT applications) and/or services that are permitted for use by and/or accessible by user device 205, information associated with a user of user device 205 (e.g., a username, a password, a personal identification number ("PIN"), etc.), subscription information, rate information, minutes allowed, bandwidth allocation policy information, and/or other information. AAA server 245 may include a device that performs authentication, authorization, and/or accounting operations associated with a communication session associated with user device 205.

OTT gateway 250 may include a device capable of managing and/or monitoring use of OTT applications by user device 205. For example, OTT gateway 250 may include a gateway, a router, a modem, a switch, a firewall, a NIC, a hub, a bridge, a server, an OADM, or any other type of device that processes and/or transfers traffic. In some implementations, OTT gateway 250 may receive and/or store an indication that quality of service treatment is to be provided for an OTT application. In some implementations, OTT gateway 250 may manage and/or monitor a traffic flow between user device 205 and OTT application server 260. For example, OTT gateway 250 may gather usage information (e.g., minutes used, quality of service treatment, etc.) based on usage, by user device 205, of an OTT application, and may transmit the usage information to billing device 265.

While shown as being located external to the EPS and the EPC, OTT gateway 250 may be implemented within the EPS and/or the EPC. Additionally, or alternatively, while shown as separate from SGW 220, PGW 225, and/or base station 210, OTT gateway 250 may be integrated into (and a part of) SGW 220, PGW 225, and/or base station 210.

Network 255 may include one or more wired and/or wireless networks. For example, network 255 may include a cellular network, a public land mobile network ("PLMN"), a second generation ("2G") network, a third generation ("3G") network, a fourth generation ("4G") network, a fifth generation ("5G") network, an LTE network, and/or another network. Additionally, or alternatively, network 255 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

OTT application server 260 may include a device, such as a server, that hosts and/or provides OTT application services. OTT application server 260 may host and execute applications and/or services, such as voice services, video services, audio services, gaming services, or the like, and may provide such services to user device 205. For example, OTT application server 260 may include a telephony application server, a video application server, a gaming application server, or the like.

Billing device 265 may include a device, such as a server, capable of receiving, storing, aggregating, and/or providing usage and billing information. For example, billing device 265 may receive usage information from OTT gateway 250 (e.g., OTT usage information, minutes used, quality of service information, etc.), PGW 225 (e.g., data usage information, such as a quantity of bytes used), AAA server 245 (e.g., non-OTT application service usage information, such as VoLTE usage information, circuit switched voice usage information, etc.), and/or another device. While shown as being located external to the EPS and the EPC, billing device 265 may be implemented within the EPS and/or the EPC.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
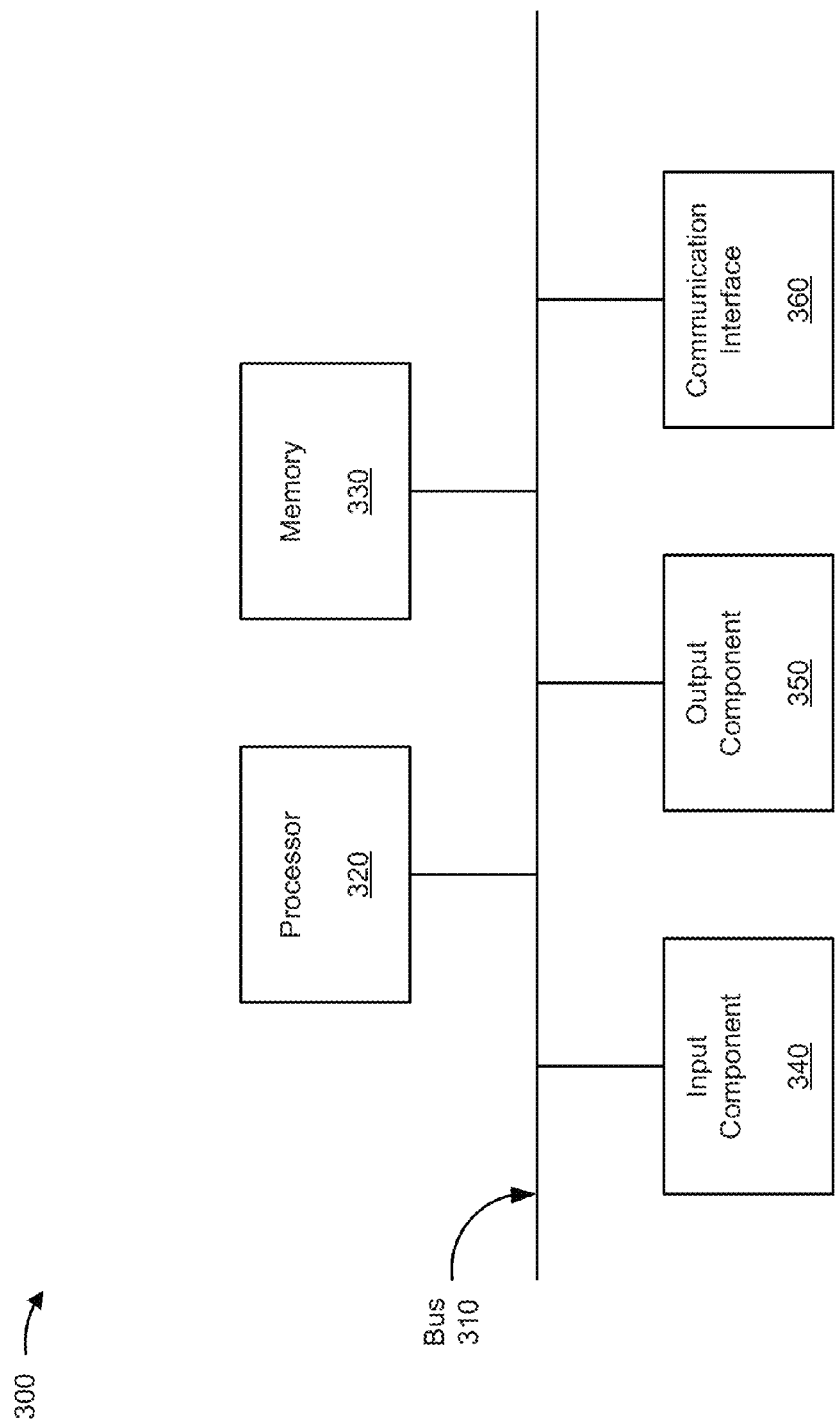
FIG. 3 is a diagram of example components of one or more devices of FIG. 2.

FIG. 3 is a diagram of example components of a device 300. Device 300 may correspond to user device 205, base station 210, MME 215, SGW 220, PGW 225, PCRF server 230, CSCF server 235, HSS 240, AAA server 245, OTT gateway 250, OTT application server 260, and/or billing device 265. Additionally, or alternatively, each of user device 205, base station 210, MME 215, SGW 220, PGW 225, PCRF server 230, CSCF server 235, HSS 240, AAA server 245, OTT gateway 250, OTT application server 260, and/or billing device 265 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3.

Figure 4:
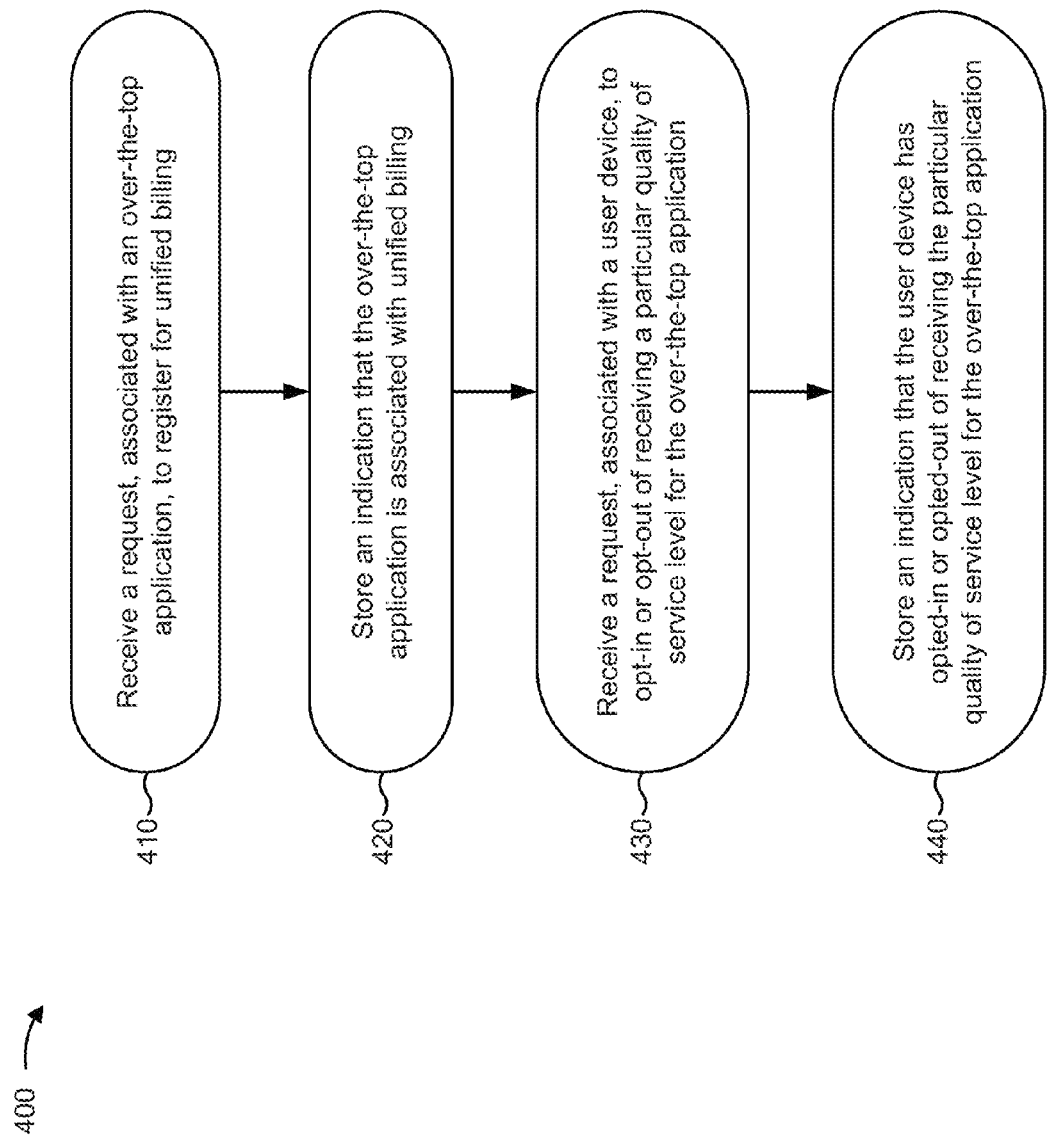
FIG. 4 is a flow chart of an example process for receiving and storing an indication that a quality of service level is to be used for providing an OTT application.

FIG. 4 is a flow chart of an example process for receiving and storing an indication that a quality of service level is to be used for an OTT application. In some implementations, one or more process blocks of FIG. 4 may be performed by OTT gateway 250. In some implementations, one or more process blocks of FIG. 4 may be performed by another device or a group of devices separate from or including OTT gateway 250, such as OTT application server 260, PGW 225, and/or HSS 240.

As shown in FIG. 4, process 400 may include receiving a request, associated with an OTT application, to register for unified billing (block 410). For example, OTT gateway 250 may receive a request indicating that billing information, associated with an OTT application, is to be included in a bill for user device 205, based on usage of the OTT application by user device 205. In some implementations, OTT gateway 250 may receive the request from OTT application server 260. Additionally, or alternatively, OTT gateway 250 may receive the request from another device (e.g., user device 205, PGW 225, etc.).

An OTT application service, as used herein, may refer to a service provided by an application server outside of a service provider network (e.g., a third party) that uses the service provider network to transfer traffic associated with the service. Quality of service may not be guaranteed to the OTT application service using the service provider network. However, users of the OTT application service may opt-in to receive a particular quality of service level for the OTT application service that uses the service provider network to transfer traffic associated with the OTT application service.

As further shown in FIG. 4, process 400 may include storing an indication that the OTT application service is associated with unified billing (block 420). For example, OTT gateway 250 may store the indication in a data structure. The indication may identify whether a particular OTT application service is to be registered for unified billing. In some implementations, OTT gateway 250 may store information associated with the indication, such as an OTT application identifier (e.g., an application type such as a voice application, a video application, etc.; an OTT application name, such as Skype, Vonage, etc.; an OTT application server identifier, such as an IP address, etc.) that identifies an OTT application associated with the unified billing registration request.

As further shown in FIG. 4, process 400 may include receiving a request, associated with a user device, to opt-in or opt-out of receiving a particular quality of service level for the OTT application (block 430). For example, OTT gateway 250 may receive a request indicating that a particular quality of service level is to be used (or is not to be used) when providing services, associated with an OTT application, to user device 205. In some implementations, OTT gateway 250 may receive the request from user device 205. Additionally, or alternatively, OTT gateway 250 may receive the request from another device (e.g., OTT application server 260, PGW 225, HSS 240, etc.).

In some implementations, a user may input information associated with the request into user device 205, and user device 205 may transmit the information and the request to OTT gateway 250. For example, the user of an OTT application may input the information associated with the request via a user interface, provided by the OTT application, being displayed on user device 205. The information input by the user may include a user identifier that identifies a user of user device 205, a user device identifier that identifies user device 205, an OTT application identifier that identifies the OTT application, a desired quality of service level for the OTT application, a selection to opt-in (e.g., receive quality of service treatment) or opt-out (e.g., not receive quality of service treatment) of receiving the desired quality of service level for the OTT application, or the like. The information and the request may be sent from user device 205 to OTT gateway 250.

The quality of service level may indicate a guarantee of a certain level of performance to a traffic flow (e.g., a traffic flow associated with a particular user, a particular user device, a particular OTT application, etc.). For example, a traffic flow associated with a high quality of service level may be prioritized over a traffic flow associated with a low quality of service level. In some implementations, the quality of service level may be indicated by a quality of service class identifier ("QCI"). QCI values may range from 1 (highest level of priority) to 9 (lowest level of priority). A traffic flow, as used herein, may refer to a sequence of packets being sent and/or received between a first device (e.g., user device 205) and a second device (e.g., OTT application server 260).

A particular quality of service level may affect one or more parameters associated with a traffic flow (e.g., a required bit rate, an amount of latency, an amount of jitter, a packet dropping probability, a bit error rate, etc.). A device that supports quality of service may determine a quality of service level associated with a traffic flow, and may dynamically control scheduling priorities in network devices to give higher priority to traffic flows associated with higher quality of service levels. The quality of service level may be important if a network is congested or if network capacity is insufficient, especially for traffic flows associated with applications that may require a fixed bit rate or that may be delay sensitive (e.g., real-time streaming multimedia applications).

As further shown in FIG. 4, process 400 may include storing an indication that the user device has opted-in or opted-out of receiving the particular quality of service level for the OTT application (block 440). For example, OTT gateway 250 may store the indication (e.g. in a data structure). The indication may identify whether a particular user and/or user device 205 has opted-in or opted-out of receiving a particular quality of service level for an OTT application service. In some implementations, OTT gateway 250 may store information associated with the indication, such as a user identifier (e.g., a user name, a subscriber name, an account number, etc.) of a user that has opted-in or opted-out; a user device identifier (e.g., an international mobile subscriber identity ("IMSI"), a mobile subscriber integrated services digital network-number ("MSISDN"), a mobile directory number ("MDN"), etc.) of a user device 205 that has opted-in or opted-out; the OTT application identifier that identifies an OTT application service that is to be provided (or not provided) using the particular quality of service level; a quality of service level (e.g., a QCI class identifier, a required parameter, etc.) to be provided to the OTT application; or the like. In some implementations, OTT gateway 250 may store an association between the indication and the user, the user device, the OTT application, etc., associated with the indication. Additionally, or alternatively, the indication may be stored by another device (e.g., HSS 240, OTT application server 260, PGW 225, etc.).

While a series of blocks has been described with regard to FIG. 4, the blocks and/or the order of the blocks may be modified in some implementations. Additionally, or alternatively, non-dependent blocks may be performed in parallel.

FIG. 5 is a diagram of an example data structure 500 that stores an indication that a quality of service level is to be used for providing an OTT application. Data structure 500 may be stored in a memory device (e.g., a RAM, a hard disk, etc.) associated with one or more devices and/or components shown in FIGS. 2 and/or 3. For example, data structure 500 may be stored by OTT gateway 250, PGW 225, and/or HSS 240.

Data structure 500 may include a collection of fields, such as a user identifier field 510, a user device identifier field 520, an OTT application identifier field 530, an opt-in field 540, an opt-out field 550, a quality of service level field 560, and a registered for unified billing field 570.

User identifier field 510 may store information that identifies a user associated with an opt-in or opt-out request. For example, the user identifier may be an OTT application username associated with the user (e.g., jsmith), a subscriber name associated with the user, an account number associated with the user, or any other string of characters.

User device identifier field 520 may store information that identifies a particular user device associated with the opt-in or opt-out request. For example, the user device identifier may include a string of characters that identifies user device 205 (e.g., "UD1"), an IMSI associated with user device 205, an MSISDN associated with user device 205, an MDN associated with user device 205, an IP address associated with user device 205, or the like.

OTT application identifier field 530 may store information that identifies an OTT application associated with the opt-in or opt-out request. For example, the OTT application identifier may identify a name of the OTT application (e.g., Voice-Call), a type of OTT application (e.g., voice application), an identifier of an application server 260 that provides the OTT application (e.g., an IP address of application server 260), etc.

Opt-in field 540 may store information that indicates that a user and/or a user device, identified by user identifier field 510 and/or user device identifier field 520, is opted-in to receive quality of service level treatment for the OTT application identified by OTT application identifier field 530.

Opt-out field 550 may store information that indicates that a user and/or a user device, identified by user identifier field 510 and/or user device identifier field 520, is opted-out of receiving quality of service treatment for the OTT application identified by OTT application identifier field 530.

Quality of service level field 560 may store information that identifies a quality of service level associated with the opt-in request stored in opt-in field 540. For example, a user and/or user device, identified by user identifier field 510 and/or user device identifier field 520, may request to receive a particular quality of service level (e.g., QCI 1, a particular bit rate, a particular latency, a particular jitter, a particular packet dropping probability, a particular bit error rate, etc.) for the OTT application service identified by OTT application identifier field 530.

Registered for unified billing field 570 may store information that indicates whether a particular OTT application service (e.g., VoiceCall), identified by OTT application identifier field 530, is registered for unified billing. For example, registered for unified billing field 570 may store an indication that the OTT application is registered for unified billing, or may store an indication that the OTT application is not registered for unified billing.

An indication associated with an opt-in or opt-out request may be conceptually represented as a single row in data structure 500. For example, the first row in data structure 500 may correspond to an indication that user jsmith, when using user device UD1 to use a VoiceCall application, is opted-in to receive traffic associated with the VoiceCall application at a quality of service level of QCI 1, and that the VoiceCall application service is registered for unified billing.

Data structure 500 includes fields 510-570 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user and/or information automatically provided by a device.

Figure 6:
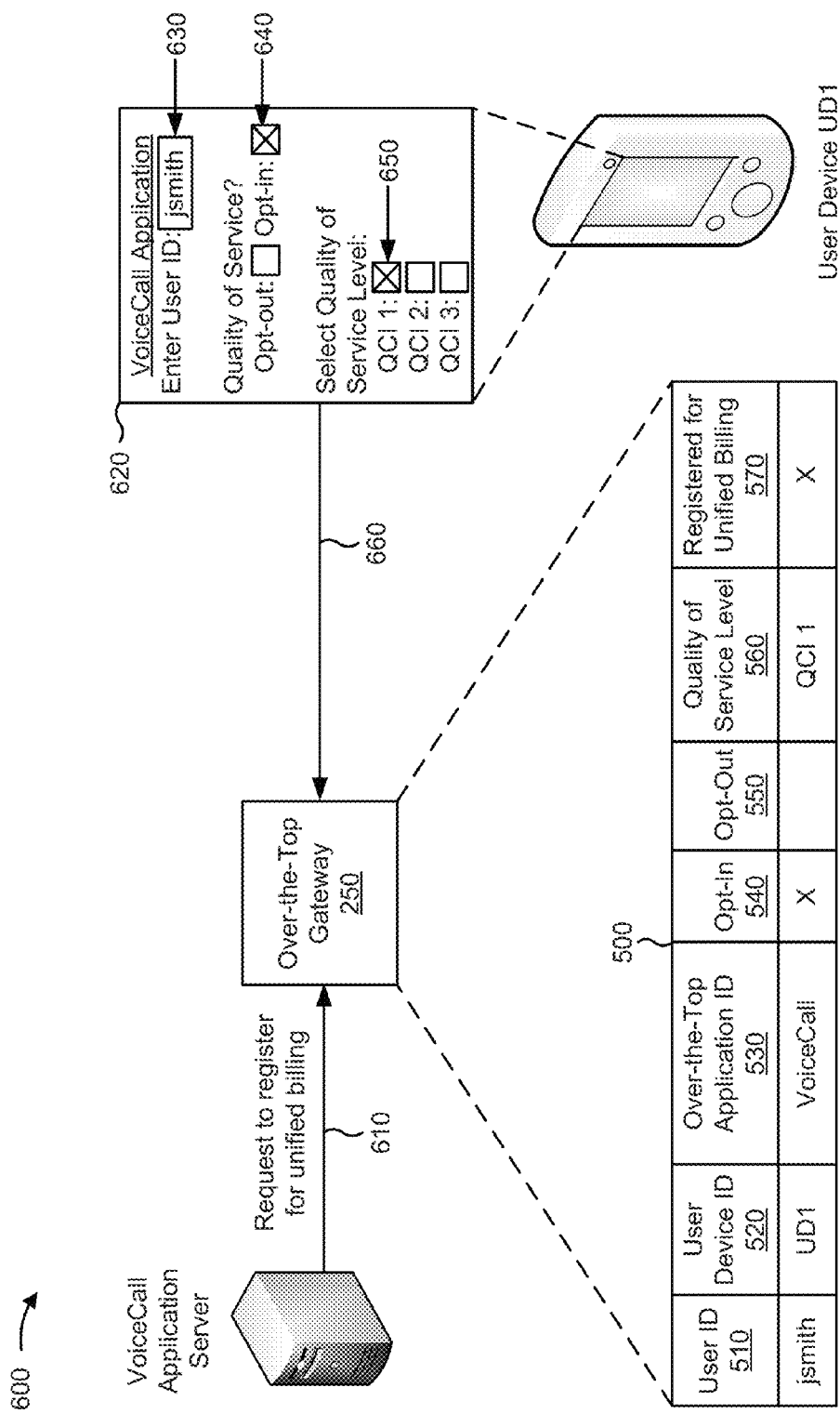
FIG. 6 is a diagram of an example implementation relating to the example process shown in FIG. 4.

FIG. 6 is a diagram of an example implementation 600 relating to example process 400 shown in FIG. 4. In example implementation 600, OTT gateway 250 may receive a request, from a VoiceCall application server, to register for unified billing, may receive an opt-in request from user device UD1, and may store an indication of the requests in data structure 500.

As shown by reference number 610, OTT gateway 250 may receive a request, from the VoiceCall application server, to register the VoiceCall application service for unified billing. As further shown in FIG. 6, OTT gateway 250 may store an indication of the registration request from the VoiceCall application server in data structure 500. For example, the indication may indicate that the VoiceCall application service is registered for unified billing.

As shown in FIG. 6, a user may interact with a user preferences user interface 620, provided on a display of user device UD1, to configure a request to opt-in or opt-out of receiving a particular quality of service level for an OTT application. For example, a user may interact (e.g., by typing, touching, clicking, etc.) with one or more input elements (e.g., a textbox, a checkbox, etc.) on user interface 620, as shown by reference numbers 630, 640, and 650, to configure a request for user device UD1 to opt-in or opt-out of receiving a particular quality of service level, to select a quality of service level, or the like. For example, a user of user device UD1 may interact with a VoiceCall application user interface by typing the username jsmith and by checking boxes indicating a desire to opt-in to receiving quality of service level QCI 1 for calls made using the VoiceCall application.

As shown by reference number 660, OTT gateway 250 may receive a request from user device UD1 to opt-in to receiving quality of service level QCI 1 when user device UD1 places a voice call using the VoiceCall application, based on the user input. As further shown in FIG. 6, OTT gateway 250 may store an indication of the request from user device UD1 in data structure 500. For example, the indication may indicate that user jsmith, on user device UD1, is opted-in to receive quality of service level QCI 1 when a call is made using the VoiceCall application.

Figure 7:
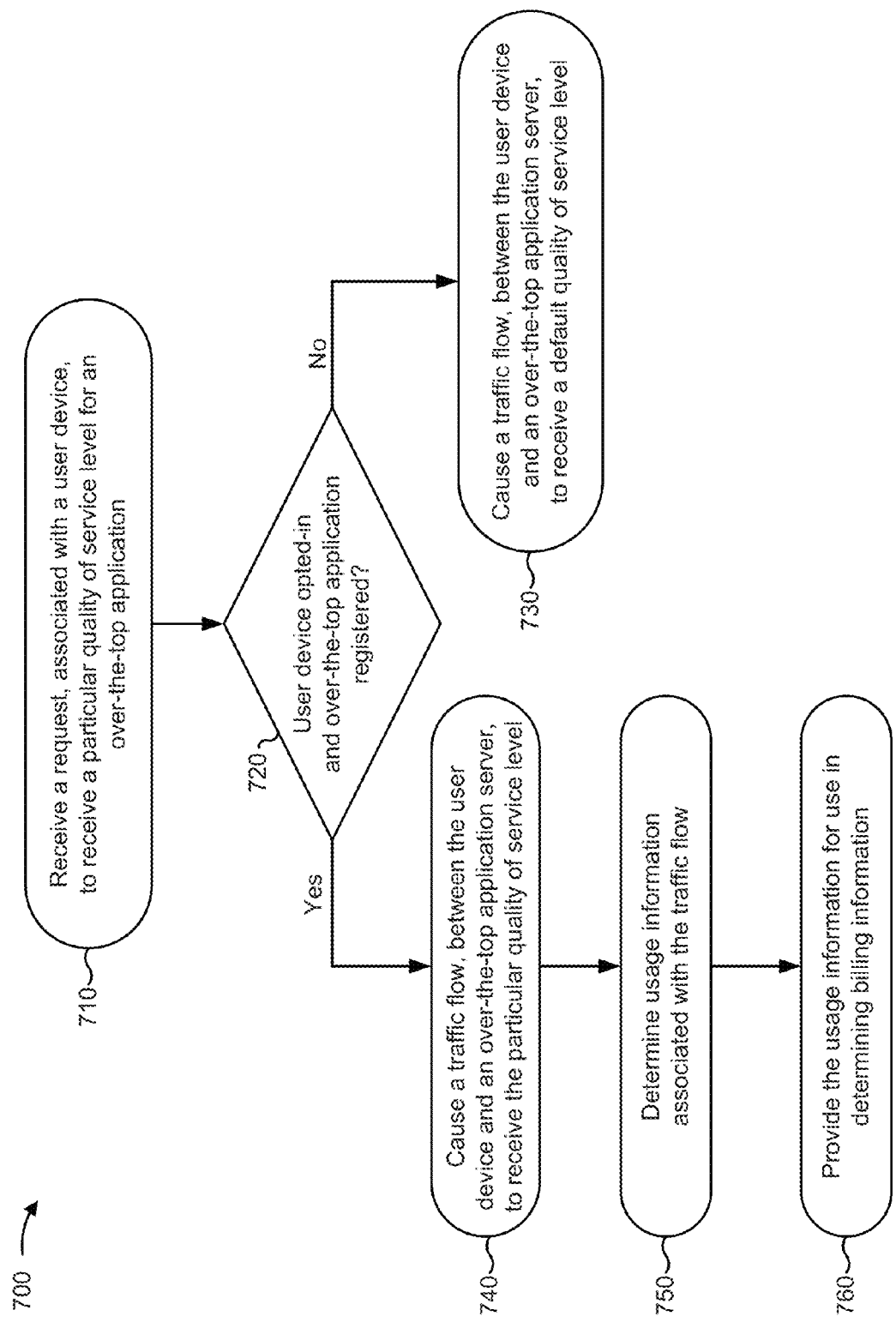
FIG. 7 is a flow chart of an example process for determining and providing quality of service usage information related to a traffic flow associated with an OTT application.

FIG. 7 is a flow chart of an example process 700 for determining and providing usage information related to a traffic flow associated with an OTT application. In some implementations, one or more process blocks of FIG. 7 may be performed by OTT gateway 250. In some implementations, one or more process blocks of FIG. 7 may be performed by another device or group of devices separate from or including OTT gateway 250, such as SGW 220 and/or PGW 225.

As shown in FIG. 7, process 700 may include receiving a request, associated with a user device, to receive a particular quality of service level for an OTT application (block 710). For example, OTT gateway 250 may receive a request to use a particular quality of service level when providing services, associated with an OTT application, to user device 205. In some implementations, OTT gateway 250 may receive the request from OTT application server 260. Additionally or alternatively, OTT gateway 250 may receive the request from some other device (e.g., user device 205, PGW 225, etc.). In some implementations, the request to receive a particular quality of service level may include information that identifies a user, a user device 205, an OTT application, a desired quality of service level, or the like.

In some implementations, user device 205 may request an OTT application service from OTT application server 260. Based on the request from user device 205, OTT application server 260 may transmit a request, to receive the particular of quality of service level, to OTT gateway 250.

As further shown in FIG. 7, process 700 may include determining whether the user device associated with the request is opted-in to receive the particular quality of service level for the OTT application, and determining whether the OTT application service is registered for unified billing (block 720). For example, OTT gateway 250 may determine whether user device 205 is opted-in to receive the particular quality of service level when providing services, associated with an OTT application, to user device 205. Additionally, or alternatively, OTT gateway 250 may determine whether the OTT application service is registered for unified billing. Additionally or alternatively, another device, such as OTT application server 260, may determine whether user device 205 is opted-in to receive a particular quality of service level for an OTT application and may determine whether the OTT application service is registered for unified billing.

In some implementations, OTT gateway 250 may determine whether user device 205 is opted-in to receive the particular quality of service level based on information associated with the request. For example, the request may identify a user, a user device, an OTT application, and/or a requested quality of service level. OTT gateway 250 may determine whether user device 205 is opted-in to receive the particular quality of service level for the OTT application by determining whether an opt-in indication associated with the user, the user device, the OTT application, and/or the quality of service level is stored in a data structure (e.g. data structure 500).

In some implementations, OTT gateway 250 may determine whether the OTT application service is registered for unified billing based on information associated with the request. For example, the request may identify an OTT application service. OTT gateway 250 may determine whether the OTT application service is registered for unified billing by determining whether a registration indication associated with the OTT application service is stored in a data structure (e.g., data structure 500).

As further shown in FIG. 7, if the user device is not opted-in to receive the particular quality of service level for the OTT application, and/or the OTT application service is not registered for unified billing (block 720—NO), then process 700 may include causing a traffic flow, between the user device and an OTT application server, to receive a default quality of service level (block 730). For example, OTT gateway 250 may determine that user device 205 is opted-out of (or not opted-in to) receiving the particular quality of service level for the OTT application, and/or may determine that the OTT application service is not registered for unified billing, based on information stored in a data structure (e.g., data structure 500).

Based on the determination, OTT gateway 250 may process the traffic flow, between user device 205 and OTT application server 260, using a default quality of service level, and/or may not instruct other devices (e.g. base station 210, SGW 220, PGW 225, OTT gateway 250, etc.) to provide the particular quality of service level when processing the traffic flow. In this case, the other devices may apply a default quality of service level to the traffic flow. A default quality of service level, as used herein, may refer to a quality of service level determined based on network conditions (e.g., service provider network conditions), device conditions (e.g., conditions associated with base station 210, SGW 220, PGW 225, OTT gateway 250, etc.), or the like.

As further shown in FIG. 7, if the user device is opted-in to receive the particular quality of service level for the OTT application, and/or the OTT application service is registered for unified billing (block 720—YES), then process 700 may include causing a traffic flow, between the user device and an OTT application server, to receive the particular quality of service level (block 740). For example, OTT gateway 250 may determine that user device 205 is opted-in to receive (or not opted-out of receiving) the particular quality of service level for the OTT application, and/or may determine that the OTT application service is registered for unified billing, based on information stored in a data structure (e.g., data structure 500).

Based on the determination, OTT gateway 250 may cause the traffic flow, between user device 205 and OTT application server 260, to receive the particular quality of service level. For example, OTT gateway 250 may process the traffic flow using the particular quality of service level, and/or may instruct other devices (e.g., base station 210, SGW 220, PGW 225, OTT gateway 250, etc.) to provide the particular quality of service level when processing the traffic flow. In some implementations, OTT gateway 250 may monitor a level of performance of the traffic flow, associated with the OTT application, and may dynamically control scheduling priorities within the service provider network in order to give priority to the traffic flow.

In some implementations, OTT gateway 250 may receive a packet, associated with the traffic flow, and may determine that the packet came from application server 260 or user device 205 (e.g., based on information in the packet header, such as information identifying a source of the packet, an OTT application associated with the packet, a user identifier associated with the packet, etc.). OTT gateway 250 may associate information with the packet (e.g., in the packet header) that identifies a quality of service level (e.g., a QCI class, a particular bit rate, etc.), and may transmit the packet, with the quality of service identifier, to other network devices (e.g., PGW 225, SGW 220, base station 210, etc.). The other network devices may then transmit, process, and/or queue the packet for transmission based on the quality of service identifier associated with the packet.

As further shown in FIG. 7, process 700 may include determining usage information associated with the traffic flow (block 750). For example, OTT gateway 250 may determine usage information associated with the traffic flow when providing the traffic flow to user device 205 and/or OTT application server 260. In some implementations, OTT gateway 250 may determine the usage information. Additionally, or alternatively, OTT gateway 250 may receive the usage information from one or more other network devices, such as PGW 225, SGW 220, HSS 240, etc.

The usage information associated with the traffic flow may include the user identifier, the user device identifier, the OTT application identifier, a start time of the traffic flow receiving the quality of service level (e.g., a time when the traffic flow is caused, a start time of a minutes timer, a start time of a byte count timer, etc.), a stop time of the traffic flow receiving the quality of service level (e.g., a time when the traffic flow is terminated, a stop time of a minutes timer, a stop time of a byte count timer, etc.), a duration of the traffic flow receiving the quality of service level (e.g. a length of time measured from the causation of the traffic flow to the termination of the traffic flow), a quantity of packets associated with the traffic flow, an amount of data associated with the traffic flow (e.g., a byte count), the quality of service level received by the traffic flow, or the like.

As further shown in FIG. 7, process 700 may include providing the usage information for use in determining billing information (block 760). For example, OTT gateway 250 may provide the usage information, associated with the traffic flow, to billing device 265. In some implementations, OTT gateway 250 may provide the usage information to billing device 265 when OTT gateway 250 determines that the traffic flow has terminated. Additionally, or alternatively, OTT gateway 250 may provide the usage information at particular intervals of time (e.g., every hour), at a particular time of day (e.g., 11:00 p.m.), at a particular time when a traffic flow falls below a threshold level (e.g., during off-peak hours), or the like.

While a series of blocks has been described with regard to FIG. 7, the blocks and/or the order of the blocks may be modified in some implementations. Additionally, or alternatively, non-dependent blocks may be performed in parallel.

Figure 8A:
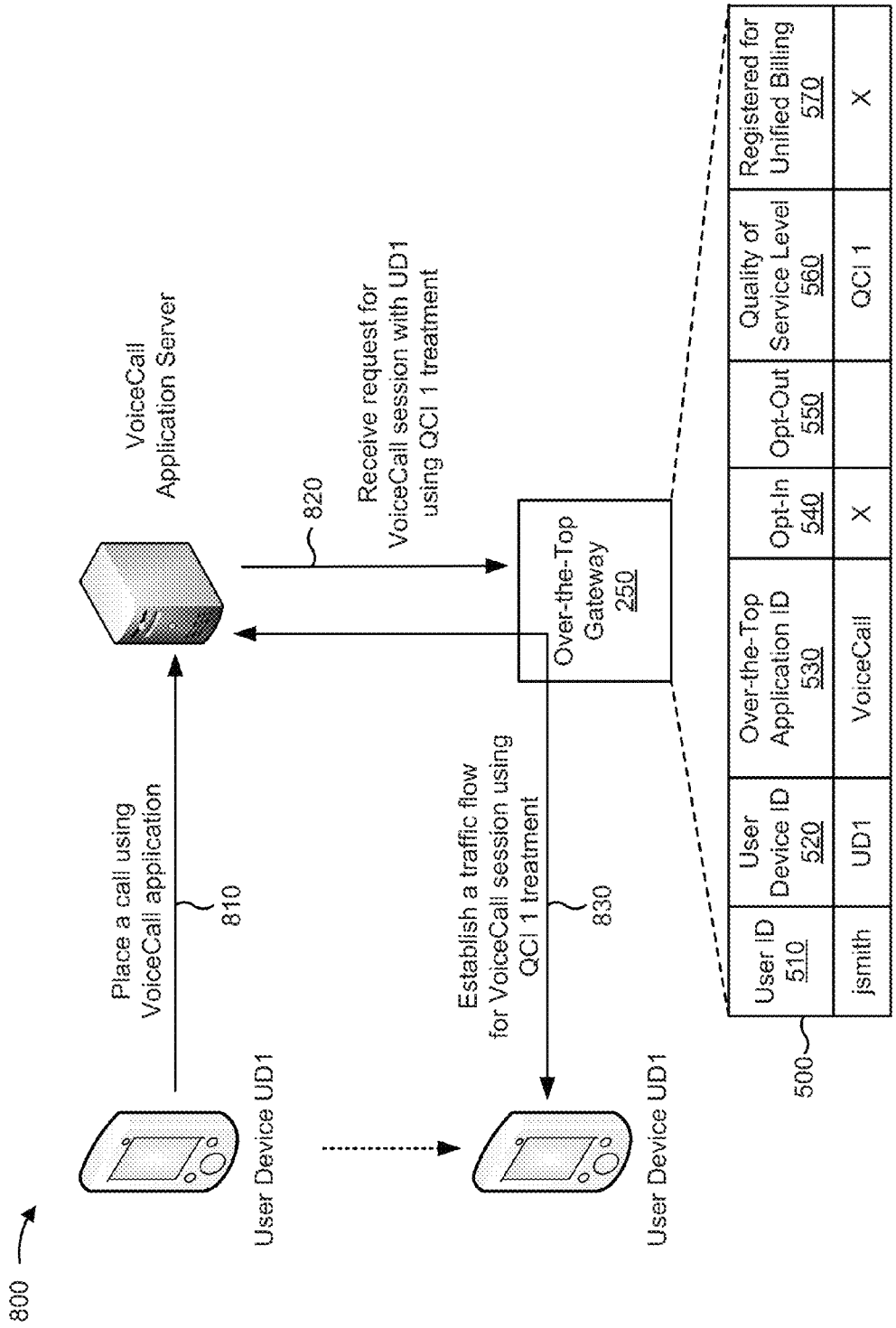

FIGS. 8A and 8B are diagrams of an example implementation 800 relating to example process 700 shown in FIG. 7. As shown in FIG. 8A, example implementation 800 may include OTT gateway 250 receiving a request to receive a particular quality of service level for a traffic flow, and causing the traffic flow to receive (e.g., to be provided using) the particular quality of service level.

As shown by reference number 810, user device UD1 may make a request to a VoiceCall application server to place a call using a VoiceCall application service. For example, a user of user device UD1 may use a VoiceCall application, stored on user device UD1, to place a voice call to another user device (not pictured). User device UD1 may transmit the request to use the VoiceCall application to a VoiceCall application server.

As shown by reference number 820, OTT gateway 250 may receive a request, from the VoiceCall application server, to receive a particular quality of service for the VoiceCall application. For example, the VoiceCall application server, upon receiving the call request from user device UD1, may transmit a request, to OTT gateway 250, for the call to receive QCI 1 treatment.

As further shown in FIG. 8A, OTT gateway 250 may determine whether the call is to receive the requested quality of service level (QCI 1). For example, OTT gateway 250 may determine that user jsmith on user device UD1 is opted-in to receive quality of service level QCI 1 when a call is made using the VoiceCall application, and may determine that the VoiceCall application service is registered for unified billing. The determination may be based on information stored in data structure 500, as shown.

As shown by reference number 830, based on determining that UD1 is opted-in, and based on determining that the VoiceCall application service is registered for unified billing, OTT gateway 250 may cause the traffic flow, between user device UD1 and the VoiceCall application server, to receive the requested quality of service level. For example, OTT gateway 250 may determine that a call placed by user device UD1 using the VoiceCall application may receive QCI 1 treatment based on information stored in data structure 500. In this instance, OTT gateway 250 may then cause a traffic flow, between user device UD1 and the VoiceCall application server, to be provided using quality of service level QCI 1.

As shown in FIG. 8B (reference number 840), OTT gateway 250 may determine usage information associated with the traffic flow between user device UD1 and the VoiceCall application server. For example, OTT gateway 250 may determine that user device UD1 placed a forty minute voice call by starting a timer when the traffic flow is established (e.g., when the call is connected) and stopping the timer when the traffic flow is terminated (e.g., when the call is terminated).

As shown by reference number 850, the usage information determined by OTT gateway 250 may be transmitted to billing device 265 for billing purposes. For example, OTT gateway 250 may transmit, to billing device 265, information indicating that user device UD1 used the VoiceCall application for forty minutes, with a quality of service level of QCI 1.

FIG. 9 is a flow chart of an example process 900 for aggregating usage information and providing billing information associated with one or more OTT applications. In some implementations, one or more process blocks of FIG. 9 may be performed by billing device 265. In some implementations, one or more process blocks of FIG. 9 may be performed by another device or a group of devices separate from or including billing device 265, such as OTT gateway 250, HSS 240, and/or AAA server 245.

As shown in FIG. 9, process 900 may include receiving usage information associated with a user device and one or more OTT applications (block 910). For example, billing device 265 may receive usage information, associated with user device 205 and one or more OTT applications, from OTT gateway 250. Additionally, or alternatively, billing device 265 may receive the usage information from another device. In some implementations, billing device 265 may receive OTT application usage information, such as minutes of usage or byte usage, from OTT gateway 250. Additionally, or alternatively, billing device 265 may receive byte usage information (e.g., associated with an OTT application and/or a non-OTT application) from PGW 225. Additionally, or alternatively, billing device 265 may receive usage information associated with a non-OTT application from AAA server 245.

As further shown in FIG. 9, process 900 may include aggregating the usage information to generate billing information (block 920). For example, billing device 265 may aggregate usage information, associated with one or more OTT applications and/or one or more non-OTT applications, received from OTT gateway 250, PGW 225, AAA server 245, and/or other devices. In some implementations, billing device 265 may aggregate usage information (e.g., total minutes of usage, total byte usage, etc.) based on the user device identifier (e.g., IMSI, MSISDN, MDN, etc.) associated with the usage information. Additionally, or alternatively, billing device 265 may aggregate the usage information based on the user identifier (e.g., a username associated with an OTT application), the application identifier (e.g., application type, such as OTT-voice, non-OTT voice, video, etc.; the application name, such as Vonage, VoLTE, etc.), the quality of service level provided (e.g., QCI 1, QCI 2, etc.), a time associated with the usage information (e.g., a date of usage, peak/off-peak usage, etc.), or the like.

Based on the aggregated usage information, billing device 265 may generate billing information. For example, based on the usage information aggregated from OTT gateway 250, PGW 225, and/or AAA server 245, billing device 265 may generate billing information to be provided to user device 205.

As further shown in FIG. 9, process 900 may include providing the billing information (block 930). For example, billing device 265 may provide the generated billing information to user device 205. Additionally, or alternatively, billing device 265 may provide the billing information to another device (e.g., another device associated with a user of user device 205, a server accessible by user device 205, etc.). In some implementations, the billing information may be provided to user device 205 for billing purposes. The provided billing information may allow a user to view a single unified bill that aggregates usage information and charges for multiple OTT applications and/or non-OTT applications (e.g., the user will not be provided with separate billing information for each OTT application and/or non-OTT application).

While a series of blocks has been described with regard to FIG. 9, the blocks and/or the order of the blocks may be modified in some implementations. Additionally, or alternatively, non-dependent blocks may be performed in parallel.

Figure 10:
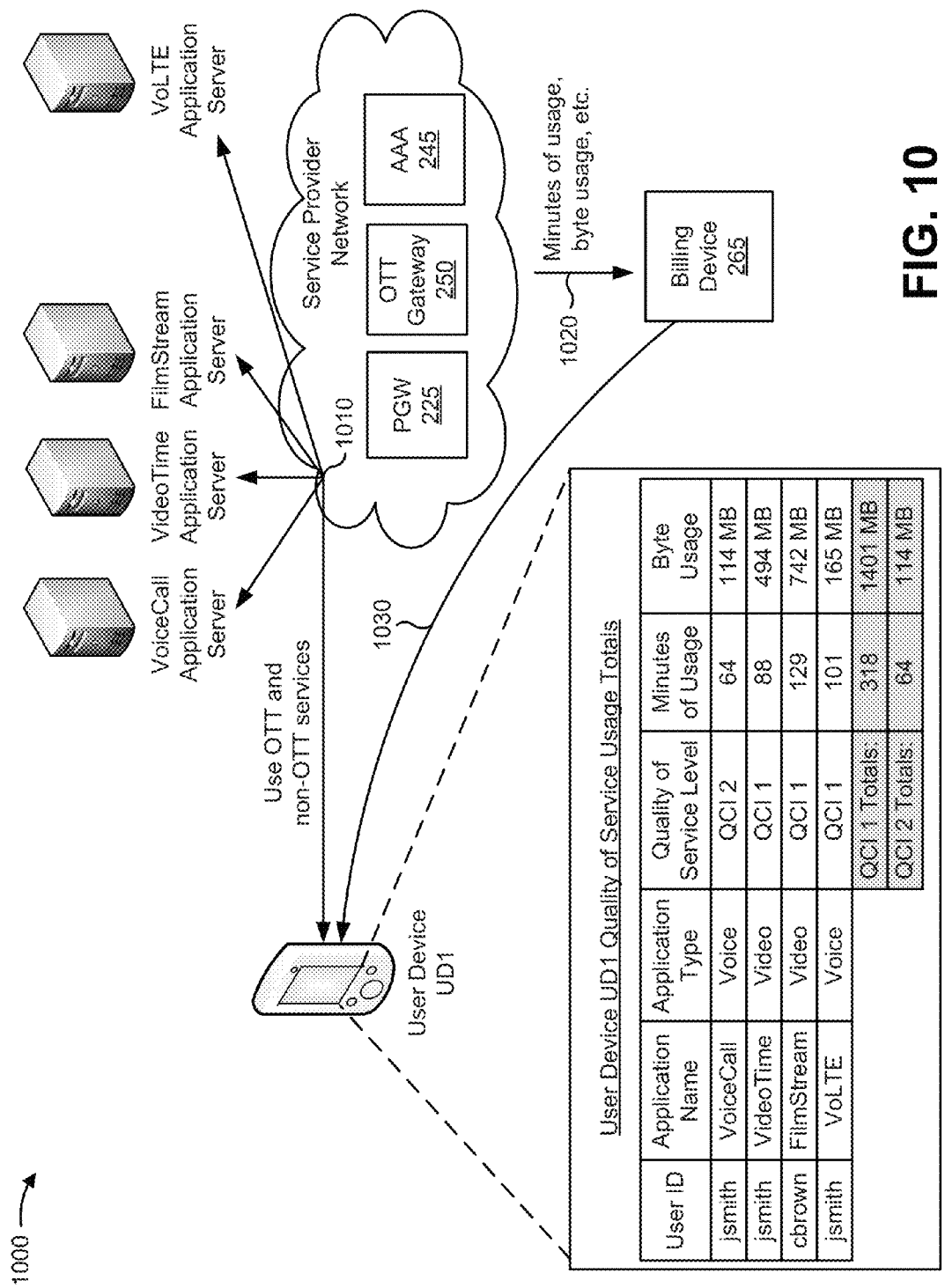
FIG. 10 is a diagram of an example implementation relating to the example process shown in FIG. 9.

FIG. 10 is a diagram of an example implementation 1000 relating to the example process shown in FIG. 9. In example implementation 1000, billing device 265 may receive usage information associated with one or more services, may aggregate the usage information in order to generate billing information, and may provide the billing information to user device UD1.

As shown by reference number 1010, user device UD1 may use services provided by one or more OTT application servers and/or non-OTT application servers. For example, assume that user device UD1 uses a VoiceCall application service, a VideoTime application service, a FilmStream application service, and a VoLTE application service. Usage information (e.g., minutes of usage, byte usage, etc.) associated with the VoiceCall, VideoTime, and FilmStream application services may be determined by OTT gateway 250 and/or PGW 225. User device UD1 usage information associated with the VoLTE application service may be determined by AAA server 245.

As shown by reference number 1020, billing device 265 may receive the usage information associated with the OTT application services and non-OTT application services. For example, billing device 265 may receive usage information associated with the VoiceCall, VideoTime, and FilmStream applications from OTT gateway 250 and/or PGW 225. Billing device 265 may also receive usage information, associated with VoLTE, from AAA server 245. As shown, user device UD1 received QCI 2 treatment while using the VoiceCall application for 64 minutes with a byte usage of 114 megabytes ("MB"), received QCI 1 treatment while using the VideoTime application for 88 minutes with a byte usage of 494 MB, received QCI 1 treatment while using the FilmStream application for 129 minutes with a byte usage of 742 MB, and received QCI 1 treatment while using the VoLTE application for 101 minutes with a byte usage of 165 MB.

Based on receipt of the usage information, billing device 265 may aggregate the usage information to generate billing information for billing purposes. For example, billing device 265 may aggregate total minutes of usage and total byte usage, for both OTT application services and non-OTT application services, based on the quality of service level received. As shown, billing device 265 may aggregate the total QCI 1 treatment usage information as a total of 318 minutes with a byte usage of 1401 MB, and may aggregate the total QCI 2 treatment usage information as a total of 64 minutes with a byte usage of 114 MB. Based on the aggregate usage information, billing device 265 may generate billing information.

As shown by reference number 1030, billing device 265 may provide the billing information to user device UD1 for billing purposes. For example, billing device 265 may provide the billing information for display on user device UD1. As shown, a user of user device UD1 may view the billing information on user device UD1 for billing purposes, to track usage, or the like.

Implementations described herein may assist a network service provider in providing a subscriber with billing information that includes usage of OTT application services. In some implementations, the generated billing information may include charges to the subscriber for the use of particular quality of service levels for OTT applications and/or non-OTT applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

The term "packet," as used herein, may refer to a packet, a datagram, a cell, a fragment of a packet, a fragment of a datagram, a fragment of a cell, or any other type or arrangement of data that may be carried at a specified communication layer.

Certain user interfaces have been described herein. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more devices to:
receive a request, associated with an over-the top application service, to register for unified billing for the over-the-top application service;
store an indication associated with the request to register for the unified billing;
receive a request to receive a particular quality of service level for a traffic flow between a user device and an over-the-top application server that provides the over-the-top application service,
the over-the-top application server being outside of a service provider network;
determine that the user device is to receive the particular quality of service level for the over-the-top application service based on receiving the request and based on the stored indication;

cause the traffic flow to receive the particular quality of service level based on determining that the user device is to receive the particular quality of service level,
 the traffic flow being transmitted using the service provider network;
determine usage information associated with the traffic flow,
 the usage information identifying the user device and the particular quality of service level; and
provide the usage information for the unified billing.

2. The system of claim 1, where the one or more devices are further to:
receive a request, associated with the user device, to opt-in or opt-out of receiving the particular quality of service level for the over-the-top application service; and
store an indication associated with the request to opt-in or opt-out; and
where the one or more devices, when determining that the user device is to receive the particular quality of service level, are further to:
 determine that the user device is to receive the particular quality of service level based on the stored indication associated with the request to opt-in or opt-out.

3. The system of claim 1, where the one or more devices, when causing the traffic flow to receive the particular quality of service level, are further to:
receive a packet associated with the traffic flow;
determine that the received packet is associated with the traffic flow between the user device and the over-the-top application server;
associate, based on determining that the received packet is associated with the traffic flow, information with the packet that identifies the particular quality of service level; and
transmit the packet, with the associated information, to a network device.

4. The system of claim 1, where the one or more devices, when determining the usage information associated with the traffic flow, are further to:
detect a start time associated with the traffic flow receiving the particular quality of service level;
detect a stop time associated with the traffic flow receiving the particular quality of service level; and
determine, based on the start time and the stop time, a duration of the traffic flow receiving the particular quality of service level,
where the one or more devices, when providing the usage information, are further to:
 provide information that identifies the duration of the traffic flow.

5. The system of claim 1, where the usage information further identifies at least one of:
a start time associated with the traffic flow receiving the particular quality of service level;
a stop time associated with the traffic flow receiving the particular quality of service level;
a duration of the traffic flow receiving the particular quality of service level;
a quantity of packets associated with the traffic flow receiving the particular quality of service level; or
an amount of data associated with the traffic flow receiving the particular quality of service level.

6. The system of claim 1, where the one or more devices are further to:
aggregate usage information associated with the user device, the particular quality of service level, and a plurality of over-the-top application services,
 the plurality of over-the-top application services including the over-the-top application service; and
where the one or more devices, when providing the usage information, are further to:
 provide the aggregated usage information.

7. A computer-readable medium storing instructions, the instructions comprising:
one or more instructions that, when executed by a processor, cause the processor to:
 receive a request to register for unified billing for over-the-top application services;
 store an indication associated with the request to register for the unified billing;
 receive a request to receive a particular quality of service level for a session between a user device and an over-the-top application server outside of a service provider network;
 determine that the session, between the user device and the over-the-top application server, is to receive the particular quality of service level based on the stored indication when being provided via the service provider network;
 cause the session, between the user device and the over-the-top application server, to receive the particular quality of service level when being provided via the service provider network;
 determine a duration of the session;
 determine usage information associated with the session based on the duration of the session; and
 transmit the usage information for the unified billing.

8. The computer-readable medium of claim 7, where the one or more instructions further cause the processor to:
receive a request, associated with the user device, to opt-in or opt-out of receiving the particular quality of service level for the session; and
store an indication associated with the request to opt-in or opt-out,
where the one or more instructions, that cause the processor to determine that the session is to receive the particular quality of service level, further cause the processor to:
 determine that the session is to receive the particular quality of service level based on the stored indication associated with the request to opt-in or opt-out.

9. The computer-readable medium of claim 7, where the one or more instructions, that cause the processor to cause the session to receive the particular quality of service level, further cause the processor to:
receive a packet associated with the session;
determine that the received packet is associated with the session between the user device and the over-the-top application server;
associate, based on determining that the received packet is associated with the session, information with the packet that identifies the particular quality of service level; and
transmit the packet, with the associated information, to a network device.

10. The computer-readable medium of claim 7, where the usage information further identifies at least one of:
a service provided by the over-the-top application server outside of the service provider network; or
the over-the-top application server outside of the service provider network.

11. The computer-readable medium of claim 7, where the usage information further identifies at least one of:
- a quantity of packets associated with the session receiving the particular quality of service level; or
- an amount of data associated with the session receiving the particular quality of service level.

12. The computer-readable medium of claim 7, where the one or more instructions further cause the processor to:
- aggregate usage information associated with the user device, the particular quality of service level, and a plurality of application services,
  - the plurality of application services including at least one service provided by the over-the-top application server outside of the service provider network; and
- where the one or more instructions, that cause the processor to transmit the usage information, further cause the processor to:
  - transmit the aggregated usage information.

13. The computer-readable medium of claim 7, where the usage information further identifies at least one of:
- a start time associated with the session receiving the particular quality of service level;
- a stop time associated with the session receiving the particular quality of service level; or
- a duration of the session receiving the particular quality of service level.

14. The computer-readable medium of claim 7, where the one or more instructions further cause the processor to:
- detect a start time associated with the session receiving the particular quality of service level;
- detect a stop time associated with the session receiving the particular quality of service level; and
- determine, based on the start time and the stop time, a duration of the session receiving the particular quality of service level,
- where the one or more instructions to transmit the usage information include:
  - one or more instructions to provide information that identifies the duration of the session receiving the particular quality of service level.

15. A method, comprising:
- receiving, by a device, a request to receive a particular quality of service level for a traffic flow associated with a user device using an over-the-top application service, the over-the-top application service being provided by an application server external to a service provider network,
  - the request identifying the particular quality of service level for the traffic flow;
- determining, by the device, that the traffic flow is to receive the particular quality of service level when being provided via the service provider network,
  - the determination being based on stored information associated with the user device;
- causing, by the device, the traffic flow to receive the particular quality of service level when being provided via the service provider network;
- aggregating, by the device, usage information associated with the traffic flow, the particular quality of service level, and one or more over-the-top application services,
  - the one or more over-the-top application services including the over-the-top application service; and
- providing, by the device, the aggregated usage information to another device.

16. The method of claim 15, further comprising:
- receiving a request, associated with the user device, to opt-in or opt-out of receiving the particular quality of service level for the traffic flow;
- storing an indication associated with the request to opt-in or opt-out; and
- where determining that the traffic flow is to receive the particular quality of service level further comprises:
  - determining that the traffic flow is to receive the particular quality of service level based on the stored indication.

17. The method of claim 15, where causing the traffic flow to receive the particular quality of service level further comprises:
- receiving a packet associated with the traffic flow;
- determining that the received packet is associated with the traffic flow;
- associating, based on determining that the received packet is associated with the traffic flow, information with the packet that identifies the particular quality of service level; and
- transmitting the packet, with the associated information, to a network device.

18. The method of claim 15, where the aggregated usage information identifies at least one of:
- the user device;
- the particular quality of service level;
- the traffic flow;
- the over-the-top application service; or
- the application server external to the service provider network.

19. The method of claim 15, further comprising:
- determining usage information associated with the traffic flow,
  - where determining the usage information associated with the traffic flow further comprises:
    - detecting a start time associated with the traffic flow receiving the particular quality of service level;
    - detecting a stop time associated with the traffic flow receiving the particular quality of service level;
    - determining, based on the start time and the stop time, a duration of the traffic flow receiving the particular quality of service level; and
    - providing information that identifies the duration of the traffic flow.

20. The method of claim 15, where the aggregated usage information identifies at least one of:
- a start time associated with the traffic flow receiving the particular quality of service level;
- a stop time associated with the traffic flow receiving the particular quality of service level;
- a duration of the traffic flow receiving the particular quality of service level;
- a quantity of packets associated with the traffic flow receiving the particular quality of service level; or
- an amount of data associated with the traffic flow receiving the particular quality of service level.

* * * * *